United States Patent
Omori

(10) Patent No.: US 8,204,136 B2
(45) Date of Patent: Jun. 19, 2012

(54) IMAGE ENCODING APPARATUS

(75) Inventor: Yuji Omori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 12/398,618

(22) Filed: Mar. 5, 2009

(65) Prior Publication Data

US 2009/0225871 A1    Sep. 10, 2009

(30) Foreign Application Priority Data

Mar. 7, 2008   (JP) ................................ 2008-058701

(51) Int. Cl.
*H04N 11/04* (2006.01)
*H04N 7/12* (2006.01)
(52) U.S. Cl. ............ 375/240.27; 375/240.24; 375/240.1
(58) Field of Classification Search .................. None
See application file for complete search history.

(56) References Cited

U.S. PATENT DOCUMENTS

| | | | | |
|---|---|---|---|---|
| 5,923,783 | A * | 7/1999 | Kawauchi et al. | 382/233 |
| 2004/0096111 | A1 * | 5/2004 | Thyagarajan | 382/239 |
| 2007/0121731 | A1 | 5/2007 | Tanizawa et al. | 375/240.24 |
| 2007/0248271 | A1 * | 10/2007 | Sakai et al. | 382/236 |
| 2008/0123745 | A1 | 5/2008 | Omori | 375/240.16 |
| 2009/0003716 | A1 * | 1/2009 | Sekiguchi et al. | 382/238 |

FOREIGN PATENT DOCUMENTS

WO   WO 2007/063808 A1   6/2007

OTHER PUBLICATIONS

"Fast Mode Decision for Intra Prediction" Joint Video Team (JVT) of ISO/IEC MPEG & ITU-T VCEG (ISO/IEC JTC1/SC29/WG11 and ITU-T SG16 Q.6), 7$^{th}$ Meeting: Pattaya II, Thailand, Mar. 7-14, 2003.

* cited by examiner

*Primary Examiner* — Joseph Ustaris
*Assistant Examiner* — Frederick Bailey
(74) *Attorney, Agent, or Firm* — Fitzpatrick, Cella, Harper & Scinto

(57) ABSTRACT

This invention provides a technique of efficiently executing prediction error calculation processing while preventing any increase in the circuit scale. An encoding apparatus of this invention includes a determination unit determining the size of an encoding target pixel block, a plurality of predicted value calculation units, a first error calculation unit calculating, based on a predicted value from a predicted value calculation unit in a prediction mode using one reference pixel value, the prediction error in the determined pixel block size, a second error calculation unit calculating, based on a predicted value from a predicted value calculation unit in a prediction mode for calculating a predicted value based on a plurality of reference pixel values, the prediction error in the determined pixel block size, and a unit determining, based on the sum of the prediction errors from the first and second error calculation units, a prediction mode.

5 Claims, 7 Drawing Sheets

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

| -1,-1 | 0,-1 | 1,-1 | 2,-1 | 3,-1 | 4,-1 | 5,-1 | 6,-1 | 7,-1 | 8,-1 | 9,-1 | 10,-1 | 11,-1 | 12,-1 | 13,-1 | 14,-1 | 15,-1 |
|---|---|---|---|---|---|---|---|---|---|---|---|---|---|---|---|---|
| -1,0 | 0,0 | 1,0 | 2,0 | 3,0 | 4,0 | 5,0 | 6,0 | 7,0 | 8,0 | 9,0 | 10,0 | 11,0 | 12,0 | 13,0 | 14,0 | 15,0 |
| -1,1 | 0,1 | 1,1 | 2,1 | 3,1 | 4,1 | 5,1 | 6,1 | 7,1 | 8,1 | 9,1 | 10,1 | 11,1 | 12,1 | 13,1 | 14,1 | 15,1 |
| -1,2 | 0,2 | 1,2 | 2,2 | 3,2 | 4,2 | 5,2 | 6,2 | 7,2 | 8,2 | 9,2 | 10,2 | 11,2 | 12,2 | 13,2 | 14,2 | 15,2 |
| -1,3 | 0,3 | 1,3 | 2,3 | 3,3 | 4,3 | 5,3 | 6,3 | 7,3 | 8,3 | 9,3 | 10,3 | 11,3 | 12,3 | 13,3 | 14,3 | 15,3 |
| -1,4 | 0,4 | 1,4 | 2,4 | 3,4 | 4,4 | 5,4 | 6,4 | 7,4 | 8,4 | 9,4 | 10,4 | 11,4 | 12,4 | 13,4 | 14,4 | 15,4 |
| -1,5 | 0,5 | 1,5 | 2,5 | 3,5 | 4,5 | 5,5 | 6,5 | 7,5 | 8,5 | 9,5 | 10,5 | 11,5 | 12,5 | 13,5 | 14,5 | 15,5 |
| -1,6 | 0,6 | 1,6 | 2,6 | 3,6 | 4,6 | 5,6 | 6,6 | 7,6 | 8,6 | 9,6 | 10,6 | 11,6 | 12,6 | 13,6 | 14,6 | 15,6 |
| -1,7 | 0,7 | 1,7 | 2,7 | 3,7 | 4,7 | 5,7 | 6,7 | 7,7 | 8,7 | 9,7 | 10,7 | 11,7 | 12,7 | 13,7 | 14,7 | 15,7 |
| -1,8 | 0,8 | 1,8 | 2,8 | 3,8 | 4,8 | 5,8 | 6,8 | 7,8 | 8,8 | 9,8 | 10,8 | 11,8 | 12,8 | 13,8 | 14,8 | 15,8 |
| -1,9 | 0,9 | 1,9 | 2,9 | 3,9 | 4,9 | 5,9 | 6,9 | 7,9 | 8,9 | 9,9 | 10,9 | 11,9 | 12,9 | 13,9 | 14,9 | 15,9 |
| -1,10 | 0,10 | 1,10 | 2,10 | 3,10 | 4,10 | 5,10 | 6,10 | 7,10 | 8,10 | 9,10 | 10,10 | 11,10 | 12,10 | 13,10 | 14,10 | 15,10 |
| -1,11 | 0,11 | 1,11 | 2,11 | 3,11 | 4,11 | 5,11 | 6,11 | 7,11 | 8,11 | 9,11 | 10,11 | 11,11 | 12,11 | 13,11 | 14,11 | 15,11 |
| -1,12 | 0,12 | 1,12 | 2,12 | 3,12 | 4,12 | 5,12 | 6,12 | 7,12 | 8,12 | 9,12 | 10,12 | 11,12 | 12,12 | 13,12 | 14,12 | 15,12 |
| -1,13 | 0,13 | 1,13 | 2,13 | 3,13 | 4,13 | 5,13 | 6,13 | 7,13 | 8,13 | 9,13 | 10,13 | 11,13 | 12,13 | 13,13 | 14,13 | 15,13 |
| -1,14 | 0,14 | 1,14 | 2,14 | 3,14 | 4,14 | 5,14 | 6,14 | 7,14 | 8,14 | 9,14 | 10,14 | 11,14 | 12,14 | 13,14 | 14,14 | 15,14 |
| -1,15 | 0,15 | 1,15 | 2,15 | 3,15 | 4,15 | 5,15 | 6,15 | 7,15 | 8,15 | 9,15 | 10,15 | 11,15 | 12,15 | 13,15 | 14,15 | 15,15 |

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

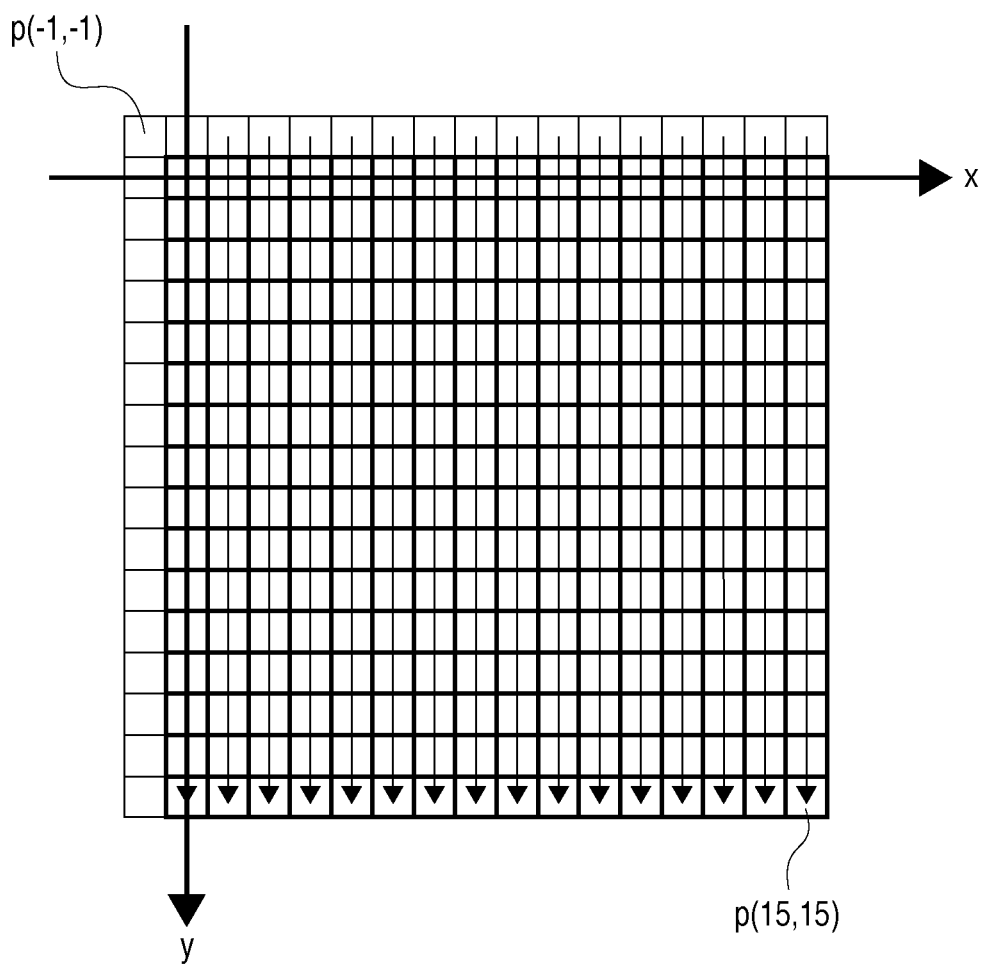

FIG. 10

| -1,-1 | 0,-1 | 1,-1 | 2,-1 | 3,-1 | 4,-1 | 5,-1 | 6,-1 | 7,-1 |
|-------|------|------|------|------|------|------|------|------|
| -1,0  | 0,0  | 1,0  | 2,0  | 3,0  | 4,0  | 5,0  | 6,0  | 7,0  |
| -1,1  | 0,1  | 1,1  | 2,1  | 3,1  | 4,1  | 5,1  | 6,1  | 7,1  |
| -1,2  | 0,2  | 1,2  | 2,2  | 3,2  | 4,2  | 5,2  | 6,2  | 7,2  |
| -1,3  | 0,3  | 1,3  | 2,3  | 3,3  | 4,3  | 5,3  | 6,3  | 7,3  |
| -1,4  | 0,4  | 1,4  | 2,4  | 3,4  | 4,4  | 5,4  | 6,4  | 7,4  |
| -1,5  | 0,5  | 1,5  | 2,5  | 3,5  | 4,5  | 5,5  | 6,5  | 7,5  |
| -1,6  | 0,6  | 1,6  | 2,6  | 3,6  | 4,6  | 5,6  | 6,6  | 7,6  |
| -1,7  | 0,7  | 1,7  | 2,7  | 3,7  | 4,7  | 5,7  | 6,7  | 7,7  |

IMAGE ENCODING APPARATUS

BACKGROUND OF THE INVENTION

1. Field of the Invention

The present invention relates to an image data encoding technique.

2. Description of the Related Art

When compressing a moving image, the image data is generally divided into brightness components and color difference components, and the respective components are encoded. International standard techniques also divide a moving image into brightness components and hue components, and encode the respective components.

First, a given picture (frame) is solely encoded without referring to other pictures. By referring to the picture, pictures to be subsequently input over a course of time are predictively encoded using motion prediction and compensation. Encoding without referring to other pictures is called intra-coding. Encoding using motion prediction and compensation by referring to other pictures is called inter-coding.

In intra-coding or inter-coding, any image data is lossy-compressed (lossy-encoded) by performing DCT (Discrete Cosine Transformation), quantization, and entropy-coding. In intra-coding, predictive coding (intra-frame predictive coding) is used in a picture without referring to other pictures.

There is known a moving image compression technique by MPEG (Motion Picture Experts Group)-4 recommended by ISO/IEC (International Organization for Standardization/International Electrotechnical Commission) and H.263+ of ITU-T (International Telecommunication Union-Telecommunication Standardization). According to this technique, in intra-frame prediction for intra-coding, blocks each having eight vertical pixels and eight horizontal pixels (to be expressed as 8×8 pixels hereinafter) are set. Each block is transformed by DCT, and coefficients obtained by the DCT are quantized. DC (Direct Current) and AC (Alternation Current) values after quantization are predicted by predictively encoding the DC and AC values of the neighboring blocks, thereby raising the compression efficiency.

The ISO/IEC MPEG and ITU-T VCEG (Video Coding Experts Group) cooperatively organized a JVT (Joint Video Team) and recommended a new video encoding standard March 2003. This standard is named MPEG-4 Part10/AVC (Advanced Video Coding) in the ISO/IEC recommendation. In the ITU-T, it is known as H.264. This recommendation includes a compression technique using intra-frame predictive coding for intra-coding. This technique uses an intra-frame predictive coding method and blocks whose sizes change between brightness components and color difference components. The brightness component is predicted in each 4×4 pixel block or 16×16 pixel block. Nine prediction methods are defined depending on the prediction direction for a 4×4 pixel block, and four prediction methods are defined depending on the prediction direction for a 16×16 pixel block (e.g., "Fast Mode Decision for Intra Prediction", JVT-G013, 7-14 Mar. 2003). The prediction directions in each block are associated with numbers called prediction modes in a one-to-one correspondence.

FIG. 3 shows the relationship between prediction modes and prediction directions when encoding a 4×4 pixel block. The prediction modes of the 4×4 pixel block are represented by numbers 0 to 8. Prediction direction number "2" represents mean value prediction.

FIG. 4 shows a 4×4 pixel block. One cell represents one pixel. A, B, C, . . . in upper case denote reference pixel values, and a, b, c, . . . in lower case denote encoding target pixels in a block of interest. Letting P(A), P(B), P(C), . . . be the brightness values of the reference pixel values A, B, C, . . . , and Pred(a), Pred(b), Pred(c), . . . be the predicted values of the encoding target pixels a, b, c, . . . , the prediction modes and predicted values of the 4×4 pixel block are represented in the following way.

Note that Pred(ALL) represents the predicted values of all pixels (4×4=16 pixels) in the block, and ">>i" indicates that an i-bit shift operation to the right side (i-bit shift to the lower bit side) should be performed. Hence, N>>1 represents that a value N is to be shifted to the right side by one bit. This is equivalent to calculating $N/2^1$ (fractions below the decimal point are dropped). N>>2 is equivalent to calculating $N/2^2=N/4$ (fractions below the decimal point are dropped). Hence, for example, "(N+1)>>1" is equivalent to calculating N/2 with its fractions below the decimal point being rounded up.

The scan order of 4×4 pixel blocks is a raster scan order starting from the pixel block at the upper left corner of an image. The coordinates of a pixel or a pixel block in an image are defined using x coordinates in the horizontal rightward direction and y coordinates in the vertical downward direction based on the origin (0,0) set at the upper left corner, as is well known. Hence, the first pixel block of a picture indicates the pixel block located at the upper left corner of the image.

<Prediction Mode "0" of 4×4 Pixel Block>

Pred(a)=Pred(e)=Pred(i)=Pred(m)=P(A)

Pred(b)=Pred(f)=Pred(j)=Pred(n)=P(B)

Pred(c)=Pred(g)=Pred(k)=Pred(o)=P(C)

Pred(d)=Pred(h)=Pred(l)=Pred(p)=P(D)

<Prediction Mode "1" of 4×4 Pixel Block>

Pred(a)=Pred(b)=Pred(c)=Pred(d)=P(I)

Pred(e)=Pred(f)=Pred(g)=Pred(h)=P(J)

Pred(i)=Pred(j)=Pred(k)=Pred(l)=P(K)

Pred(m)=Pred(n)=Pred(o)=Pred(p)=P(L)

<Prediction Mode "2" of 4×4 Pixel Block>

[When the 4×4 pixel block is located at the start of the picture]

Pred(ALL)=128

[When the 4×4 pixel block is located on the upper edge of the picture]

Pred(ALL)={P(I)+P(J)+P(K)+P(L)+2}>>2

[When the 4×4 pixel block is located on the left edge of the picture]

Pred(ALL)={P(A)+P(B)+P(C)+P(D)+2}>>2

[Other Cases]

Pred(ALL)={P(A)+P(B)+P(C)+P(D)+P(I)+P(J)+P(K)+P(L)+4}>>3

<Prediction Mode "3" of 4×4 Pixel Block>

Pred(a)={P(A)+2P(B)+P(C)+2}>>2

Pred(b)=Pred(e)={P(B)+2P(C)+P(D)+2}>>2

Pred(c)=Pred(f)=Pred(i)={P(C)+2P(D)+P(E)+2}>>2

Pred(d)=Pred(g)=Pred(j)=Pred(m)={P(D)+2P(E)+P(F)+2}>>2

Pred($h$)=Pred($k$)=Pred($n$)={$P(E)$+2$P(F)$+$P(G)$+2}>>2

Pred($l$)=Pred($o$)={$P(F)$+2$P(G)$+$P(H)$+2}>>2

Pred($p$)={3$P(G)$+$P(H)$+2}>>2

<Prediction Mode "4" of 4×4 Pixel Block>

Pred($a$)=Pred($f$)=Pred($k$)=Pred($p$)={$P(A)$+2$P(M)$+$P(I)$+2}>>2

Pred($b$)=Pred($g$)=Pred($l$)={$P(M)$+2$P(A)$+$P(B)$+2}>>2

Pred($c$)=Pred($h$)={$P(A)$+2$P(B)$+$P(C)$+2}>>2

Pred($d$)={$P(B)$+2$P(C)$+$P(D)$+2}>>2

Pred($e$)=Pred($j$)=Pred($o$)={$P(M)$+2$P(I)$+$P(J)$+2}>>2

Pred($i$)=Pred($n$)={$P(I)$+2$P(J)$+$P(K)$+2}>>2

Pred($m$)={$P(J)$+2$P(K)$+$P(L)$+2}>>2

<Prediction Mode "5" of 4×4 Pixel Block>

Pred($a$)=Pred($j$)={$P(M)$+$P(A)$+1}>>1

Pred($b$)=Pred($k$)={$P(A)$+$P(B)$+1}>>1

Pred($c$)=Pred($l$)={$P(B)$+$P(C)$+1}>>1

Pred($d$)={$P(C)$+$P(D)$+1}>>1

Pred($f$)=Pred($o$)={$P(M)$+2$P(A)$+$P(B)$+2}>>2

Pred($g$)=Pred($p$)={$P(A)$+2$P(B)$+$P(C)$+2}>>2

Pred($h$)={$P(B)$+2$P(C)$+$P(D)$+2}>>2

Pred($e$)=Pred($n$)={$P(I)$+2$P(M)$+$P(A)$+2}>>2

Pred($i$)={$P(J)$+2$P(I)$+$P(M)$+2}>>2

Pred($m$)={$P(K)$+2$P(J)$+$P(I)$+2}>>2

<Prediction Mode "6" of 4×4 Pixel Block>

Pred($a$)=Pred($g$)={$P(M)$+$P(I)$+1}>>1

Pred($e$)=Pred($k$)={$P(I)$+$P(J)$+1}>>1

Pred($i$)=Pred($o$)={$P(J)$+$P(K)$+1}>>1

Pred($m$)={$P(K)$+$P(L)$+1}>>1

Pred($f$)=Pred($l$)={$P(M)$+2$P(I)$+$P(J)$+2}>>2

Pred($j$)=Pred($p$)={$P(I)$+2$P(J)$+$P(K)$+2}>>2

Pred($n$)={$P(J)$+2$P(K)$+$P(L)$+2}>>2

Pred($b$)=Pred($h$)={$P(A)$+2$P(M)$+$P(I)$+2}>>2

Pred($c$)={$P(B)$+2$P(A)$+$P(M)$+2}>>2

Pred($d$)={$P(C)$+2$P(B)$+$P(A)$+2}>>2

<Prediction Mode "7" of 4×4 Pixel Block>

Pred($a$)={$P(A)$+$P(B)$+1}>>1

Pred($b$)=Pred($i$)={$P(B)$+$P(C)$+1}>>1

Pred($c$)=Pred($j$)={$P(C)$+$P(D)$+1}>>1

Pred($d$)=Pred($k$)={$P(D)$+$P(E)$+1}>>1

Pred($l$)={$P(E)$+$P(F)$+1}>>1

Pred($e$)={$P(A)$+2$P(B)$+$P(C)$+2}>>2

Pred($f$)=Pred($m$)={$P(B)$+2$P(C)$+$P(D)$+2}>>2

Pred($g$)=Pred($n$)={$P(C)$+2$P(D)$+$P(E)$+2}>>2

Pred($h$)=Pred($o$)={$P(D)$+2$P(E)$+$P(F)$+2}>>2

Pred($p$)={$P(E)$+2$P(F)$+$P(G)$+2}>>2

<Prediction Mode "8" of 4×4 Pixel Block>

Pred($a$)={$P(I)$+$P(J)$+1}>>1

Pred($e$)=Pred($c$)={$P(J)$+$P(K)$+1}>>1

Pred($i$)=Pred($g$)={$P(K)$+$P(L)$+1}>>1

Pred($b$)={$P(I)$+2$P(J)$+$P(K)$+2}>>2

Pred($f$)=Pred($d$)={$P(J)$+2$P(K)$+$P(L)$+2}>>2

Pred($j$)=Pred($h$)={$P(J)$+3$P(K)$+2}>>2

Pred($k$)=Pred($l$)=Pred($m$)=Pred($n$)=Pred($o$)=Pred($p$)=$P(L)$

The relationship between prediction modes and prediction directions of a 16×16 pixel block will be described next. In a 16×16 pixel block, prediction mode "0" is vertical prediction, prediction mode "1" is horizontal prediction, prediction mode "2" is mean value prediction, and prediction mode "3" is planar prediction. FIG. 5 shows a 16×16 pixel block. Let $P(x,y)$ be the pixel value of a pixel $(x,y)$, and $Pred(x,y)$ be the predicted value of the pixel $(x,y)$. Predicted values in each prediction direction are represented in the following way.

<Prediction Mode "0" of 16×16 Pixel Block>

Pred($x,y$)=$P(x,-1)$($x$=0 to 15,$y$=0 to 15)

<Prediction Mode "1" of 16×16 Pixel Block>

Pred($x,y$)=$P(-1,y)$($x$=0 to 15,$y$=0 to 15)

<Prediction Mode "2" of 16×16 Pixel Block>
[At the Start of the Picture]

Pred($x,y$)=128($x$=0 to 15,$y$=0 to 15)

[On the Upper Edge of the Picture]

Pred($x,y$)={$\Sigma P(-1,y)$+8}>>4($x$=0 to 15,$y$=0 to 15)

[On the Left Edge of the Picture]

Pred($x,y$)={$\Sigma P(x,-1)$+8}>>4($x$=0 to 15,$y$=0 to 15)

[Other Cases]

Pred($x,y$)={$\Sigma P(x,-1)$+$\Sigma P(-1,y)$+16}>>5($x$=0 to 15,$y$=0 to 15)

<Prediction Mode "3" of 16×16 Pixel Block>

Pred($x,y$)={$a$+$b$×($x$−7)+$c$×($y$−7)+16}>>5

$a$=16×{$P(-1,15)$+$P(15,-1)$}

$b$=(5×$H$+32)>>6

$c$=(5×$V$+32)>>6

$H=P(8,-1)-P(6,-1)+P(9,-1)-P(5,-1)+P(10,-1)-P(4,-1)+P(11,-1)-P(3,-1)+P(12,-1)-P(2,-1)-P(13,-1)-P(1,-1)+P(14,-1)-P(0,-1)+P(15,-1)-P(-1,-1)$ $V=P(-1,8)-P(-1,6)+P(-1,9)-P(-1,5)+P(-1,10)-P(-1,4)+P(-1,11)-P(-1,3)+P(-1,12)-P(-1,2)-P(-1,13)-P(-1,1)+P(-1,14)-P(-1,0)+P(-1,15)-P(-1,-1)$

A prediction mode having a smaller numerical value is more frequently selected for prediction.

For a color difference component, four prediction directions are used. The block size is 8×8 pixels. The prediction method using an 8×8 pixel block for color difference components is different from the prediction method using a 16×16 pixel block for brightness components in the prediction mode numbers and prediction directions. More specifically, in an 8×8 pixel block prediction for color difference components, prediction mode "0" is mean value prediction, prediction mode "1" is horizontal prediction, prediction mode "2" is vertical prediction, and prediction mode "3" is planar prediction.

The JVC is also developing H.264/AVC Fidelity Range Extensions Amendment including still image encoding. This amendment proposes an intra-frame prediction method using an 8×8 pixel block for brightness components. For the prediction method using an 8×8 pixel block for brightness components, nine prediction methods are defined depending on the prediction direction, like the prediction method using a 4×4 pixel block. The prediction modes and prediction directions are the same as in a 4×4 pixel block. Predicted values are also calculated in the same manner as in a 4×4 pixel block.

However, the recommendation does not define how to select a block size and a prediction direction to ensure efficient prediction for predictive intra-coding. Actually, a block size and a prediction direction to ensure a maximum efficiency may be determined based on the prediction results for all block sizes and all prediction directions. However, the determination method based on the prediction results for all block sizes and all prediction directions requires a large circuit scale and an enormous calculation amount. It is therefore difficult for this method to perform encoding in real time.

Alternatively, in accordance with a block unit (to be referred to as a prediction unit hereinafter) used for prediction in a block around the encoding target or the image information of the encoding target block, the prediction unit of the encoding target block may be determined in advance. Prediction may be performed in all prediction directions for the determined prediction unit, and a most efficient prediction direction may be selected. At this time, if prediction units for all prediction modes of a 4×4 pixel block are provided, a prediction unit for a prediction unit such as a 16×16 pixel block or 8×8 pixel block can be implemented by repetitively using the prediction units for a 4×4 pixel block. However, the above-described method requires a longer process time for prediction.

For example, for predictive intra-coding in prediction mode "0" of a 4×4 pixel block, predicted values are calculated as shown in FIG. 6. One cell in FIG. 6 represents one pixel. A, B, C, . . . in upper case denote reference pixel values, and a, b, c, . . . in lower case denote predictive encoding target pixels. Letting P(A), P(B), P(C), . . . be the brightness values of the reference pixel values A, B, C, . . . , predicted values Pred(a), Pred(b), Pred(c), . . . of the predictive encoding target pixels a, b, c, . . . are obtained in the following way.

$$Pred(a)=Pred(e)=Pred(i)=Pred(m)=P(A)$$

$$Pred(b)=Pred(f)=Pred(j)=Pred(n)=P(B)$$

$$Pred(c)=Pred(g)=Pred(k)=Pred(o)=P(C)$$

$$Pred(d)=Pred(h)=Pred(l)=Pred(p)=P(D)$$

For intra-coding in prediction mode "0" of a 16×16 pixel block, predicted values are calculated as shown in FIG. 7. The coordinates of the pixel at the upper left corner of the pixel block shown in FIG. 7 are defined as (0,0). The pixel value of the pixel p(0,0) is represented by P(0,0). The predicted value Pred(x,y) of the pixel p(x,y) is obtained by Pred(x,y)=P(x,−1) (x=0 to 15, y=0 to 15)

At this time, predicted values for a 16×16 pixel block are calculated using the predicted value calculation units for intra-coding of a 4×4 pixel block. If P(A)=P(m,−1), P(B)=P(m+1,−1), P(C)=P(m+2,−1), and P(D)=P(m+3,−1) (m=0, 4, 8, and 12), the predicted values are $$P(m,n)=P(m,n+1)=P(m,n+2)=P(m,n+3)=P(A)$$

$$P(m+1,n)=P(m+1,n+1)=P(m+1,n+2)=P(m+1,n+3)=P(B)$$

$$P(m+2,n)=P(m+2,n+1)=P(m+2,n+2)=P(m+2,n+3)=P(C)$$

$$P(m+3,n)=P(m+3,n+1)=P(m+3,n+2)=P(m+3,n+3)=P(D)$$

$$(m,n)=\{(0,0),(0,4),(0,8),(0,12),(4,0),(4,4),(4,8),(4,12),\\(8,0),(8,4),(8,8),(8,12),(12,0),(12,4),(12,8),(12,12)\}$$

To implement prediction in prediction mode "0" of a 16×16 pixel block using the prediction units in prediction mode "0" of a 4×4 pixel block, the prediction units must be used 16 times repetitively.

SUMMARY OF THE INVENTION

The present invention has been made to solve the above-described problems, and has as its object to provide a technique of efficiently executing prediction error calculation processing for each block size in a corresponding prediction mode while preventing any increase in the circuit scale.

To solve the above-described problems, an image encoding apparatus according to the present invention has the following arrangement. More specifically, the image encoding apparatus which calculates a prediction error in each predetermined pixel block of an input picture by referring to a pixel in the picture and supplies the prediction error to an encoding unit, thereby encoding the picture, comprises a storage unit which stores image data of an encoding target picture; a determination unit which determines a size of an encoding target pixel block; a plurality of predicted value calculation units corresponding to all prediction modes of the predetermined pixel block; a first prediction error calculation unit which calculates, based on a predicted value from a predicted value calculation unit in a prediction mode using one reference pixel value as a predicted value, a prediction error of a predetermined pixel in the pixel block size determined by the determination unit; a second prediction error calculation unit which calculates, based on a predicted value from a predicted value calculation unit in a prediction mode for calculating a predicted value based on a plurality of reference pixel values, a prediction error of each pixel in the pixel block size determined by the determination unit; an output unit which determines, based on a sum of the prediction errors calculated by the first prediction error calculation unit and the second prediction error calculation unit, a prediction mode which minimizes the sum of the prediction errors, and outputs, to the encoding unit, a prediction error obtained by a prediction error calculation unit corresponding to the determined prediction mode; and a control unit which controls to cause the second prediction error calculation unit to calculate the prediction error from one reference pixel value based on the block size determined by the determination unit.

According to the present invention, it is possible to provide a technique of efficiently executing prediction error calculation processing for each block size in a corresponding prediction mode while preventing any increase in the circuit scale.

Further features of the present invention will become apparent from the following description of exemplary embodiments with reference to the attached drawings.

BRIEF DESCRIPTION OF THE DRAWINGS

FIG. 7 is a view showing the prediction direction in prediction mode "0" of a 16×16 pixel block;

FIG. 8 is a view showing the prediction direction in prediction mode "4" of a 4×4 pixel block;

FIG. 10 is a view showing an example of an 8×8 pixel block.

DESCRIPTION OF THE EMBODIMENTS

An embodiment of the present invention will now be described in detail with reference to the accompanying drawings.

Figure 1:
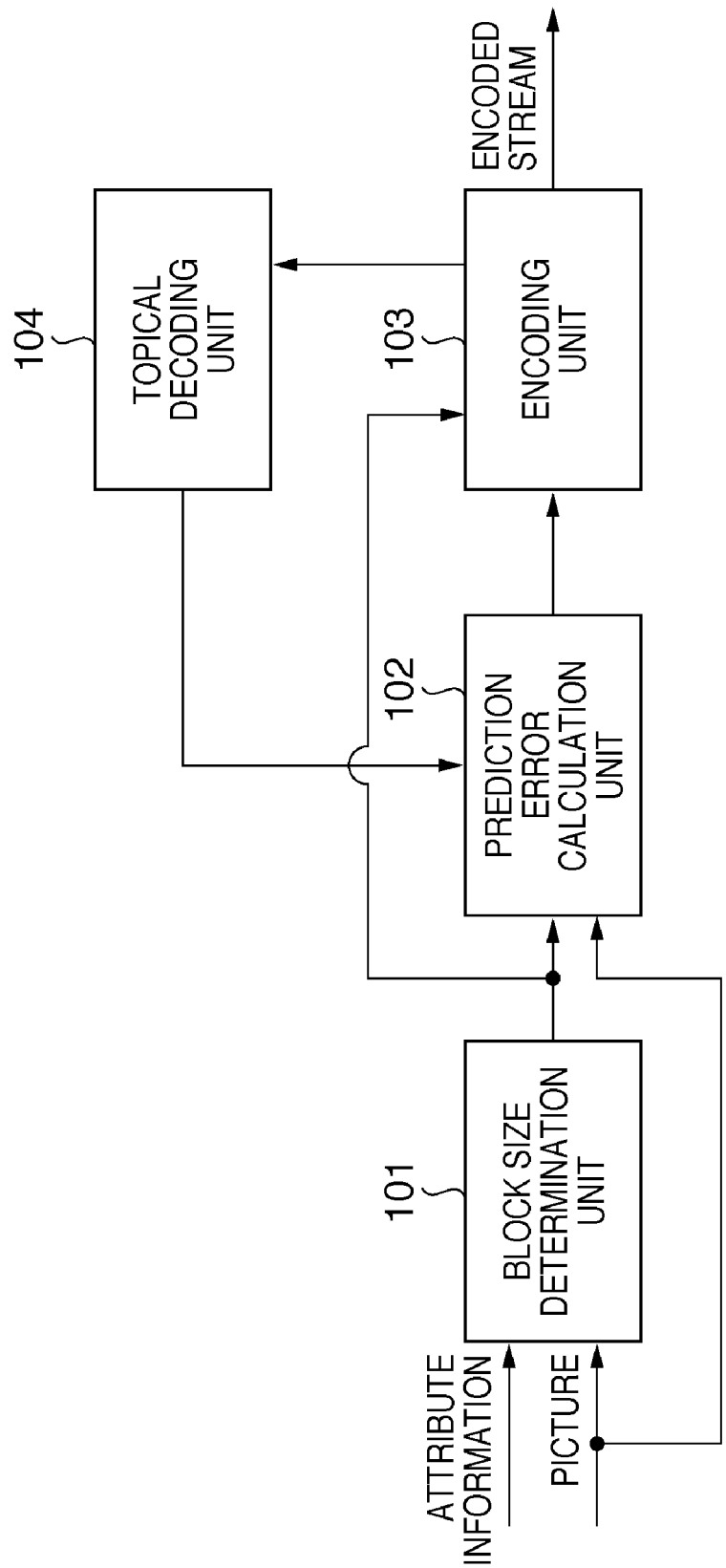
FIG. 1 is a block diagram of an image encoding apparatus for performing predictive intra-coding according to an embodiment.

FIG. 1 is a block diagram showing an arrangement associated with intra-coding by an image encoding apparatus to which the present invention is applied. A known arrangement is adopted for inter-coding, and a description thereof will be omitted.

This apparatus includes a block size determination unit 101, prediction error calculation unit 102, encoding unit 103, and topical decoding unit 104.

The block size determination unit 101 receives one image data of a moving image (a picture corresponding to one frame of moving image data) and the attribute information (parameters such as an image size) of the moving image. The block size determination unit 101 analyzes the received image data and determines the size of a pixel block as a unit of encoding. There are three kinds of pixel block sizes: 4×4, 8×8, and 16×16 pixels. In the embodiment, the block size determination unit 101 calculates the maximum value of the number of continuous pixels having the same pixel value in the image data. The horizontal and vertical sizes of the image data are obtained from the attribute information. Hence, the block size determination unit 101 also calculates a ratio R of the maximum value to the total number of pixels. The size of a pixel block is determined in proportion to the ratio R. For example, the ratio R is compared with two preset thresholds Th1 and Th2 (Th2>Th1). Then, the pixel block size of the unit of encoding is determined in the following way.

Th2<R→the unit of encoding is a 16×16 pixel block

Th1<R≦Th2→the unit of encoding is an 8×8 pixel block

R≦Th1→the unit of encoding is a 4×4 pixel block

That is, as the ratio of the number of continuous pixels having the same pixel value rises, the pixel block size is increased. As a result, if an image includes many continuous pixels having the same pixel value, a large block can reduce overhead and increase the encoding efficiency, as compared to a small block. To the contrary, if the ratio of continuous pixels having the same pixel value is low, the encoding efficiency can be obviously increased by using a small block. The algorithm of determining the block size is not limited to this, and any other method is usable. For example, the histogram of the pixel values of image data to be encoded is created (for a color image normally having three color components, a three-dimensional histogram is created). The variance or standard deviation is calculated, and the block size is determined based on the variance (or standard deviation). Alternatively, the size of a pixel block may be determined in accordance with a user instruction input via a user interface such as an operation unit or a keyboard (not shown).

The block size determination unit 101 supplies information (two bits suffice) to specify the determined pixel block size to the prediction error calculation unit 102 and the encoding unit 103. Note that the block size is fixed during encoding of one image (picture).

The prediction error calculation unit 102 segments the received image data into blocks in the block size determined by the block size determination unit 101, and calculates the difference between each pixel included in one pixel block and a predicted value in each prediction mode. The prediction error calculation unit 102 obtains the sum of prediction errors in each prediction mode. The prediction error calculation unit 102 selects a prediction mode in which the sum of prediction errors minimizes, and outputs, to the encoding unit 103, information representing the prediction mode and prediction error information obtained in the determined prediction mode.

The encoding unit 103 stores the block size received from the block size determination unit in the header of one frame encoded data stream and outputs it. The information to specify the prediction mode from the prediction error calculation unit 102 is stored in the block header. The prediction error information is subjected to quantization, transformation, and entropy encoding and output as an encoded stream following the block header. The encoding unit 103 also outputs the encoded data of each block to the topical decoding unit 104.

The topical decoding unit 104 decodes the encoded data of one block received from the encoding unit 103, and outputs the image data of one block as the decoding result to the prediction error calculation unit 102. The decoded image data is output to the prediction error calculation unit 102 because it calculates the predicted value of each pixel of a block of interest by referring to pixel values in an already encoded region near the block of interest.

Figure 2:
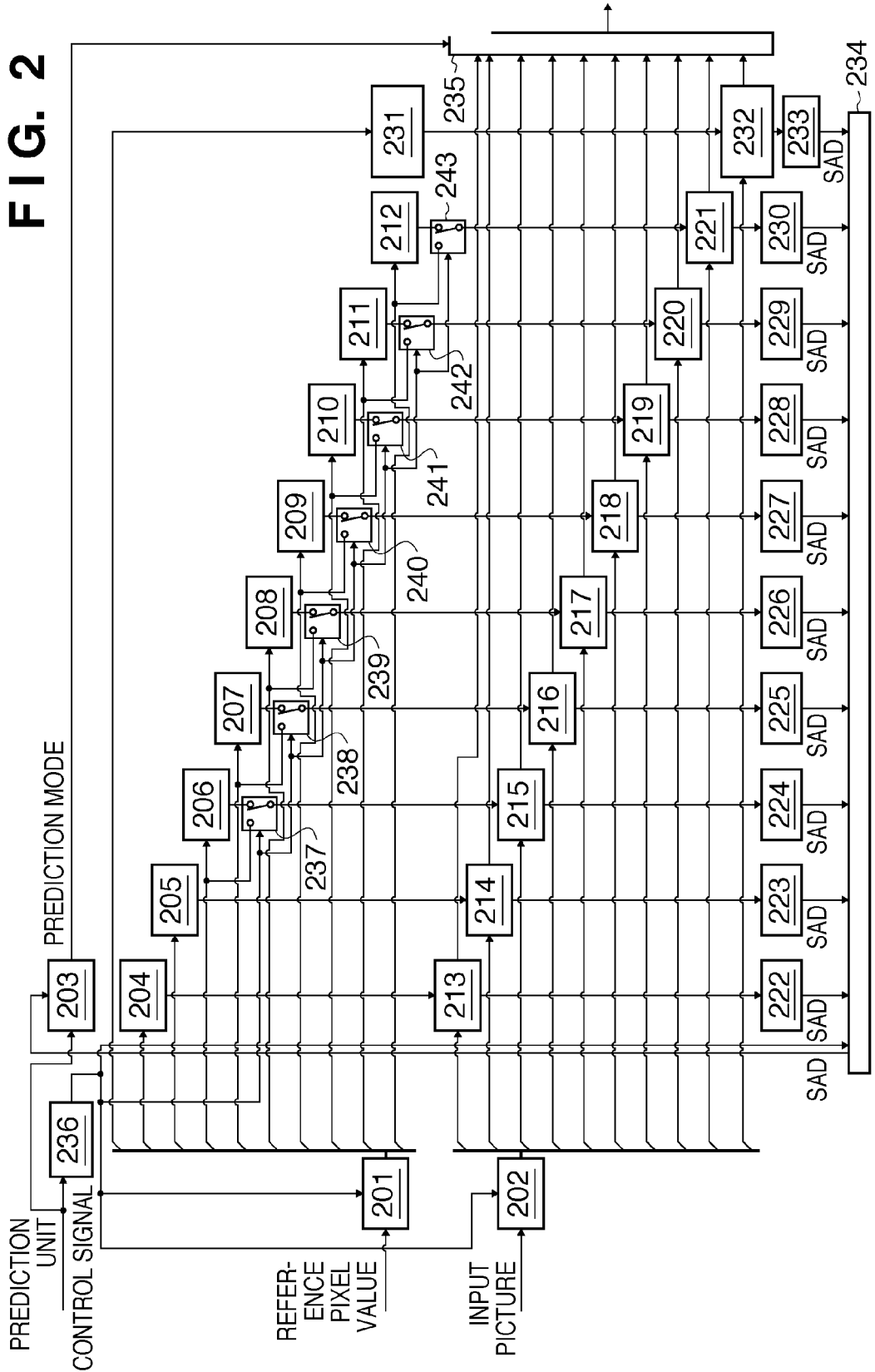
FIG. 2 is a block diagram showing the arrangement of a prediction error calculation unit according to the embodiment.

The prediction error calculation unit 102 according to the embodiment will be described next. FIG. 2 is a block diagram showing the detailed arrangement of the prediction error calculation unit 102 according to the embodiment. Each processing unit included in the prediction error calculation unit 102 will be described below.

A control unit 236 controls the processing units in the prediction error calculation unit 102 based on the block size received from the block size determination unit 101. The control includes pixel value readout from a reference pixel value storage unit 201, intra-block pixel data readout from a picture storage unit 202, and connection of switches 237 to 243.

The reference pixel value storage unit 201 stores already encoded image data (decoding result from the topical decoding unit 104) adjacent to a block of interest which is a prediction error calculation target. The picture storage unit 202 temporarily stores received image data.

The picture storage unit 202 stores image data (one picture) to be encoded.

A chroma 8×8 mode "0" predicted value calculation unit 231 calculates 8×8 color difference predicted values. A chroma 8×8 mode "0" prediction error calculation unit 232 calculates the difference between the actual color difference and the predicted color difference and outputs the result to a prediction error output unit 235 and a SAD calculation unit 233. For the color difference, the block size is 8×8 pixels independently of the prediction block size for brightness.

If the encoding target image is a monochrome image, the chroma 8×8 mode "0" predicted value calculation unit 231, chroma 8×8 mode "0" prediction error calculation unit 232, prediction error output unit 235, and SAD calculation unit 233 may be omitted.

For the descriptive convenience, assume that the block size determination unit 101 selects 4×4 pixels as the pixel block size which is the prediction unit for brightness.

In this case, the control unit 236 outputs a selection control signal to the plurality of switches 237 to 243 so that the switches 237 to 243 select the outputs from predicted value calculation units 206 to 212, respectively.

As described above, if the unit of encoding is a 4×4 pixel block, there are a total of nine prediction modes "0" to "8" for brightness. In this embodiment, since prediction error calculations are performed in parallel, a plurality of predicted value calculation units and a plurality of prediction error calculation units are present, and they are arranged in parallel.

Each of predicted value calculation units 204 to 212 (nine in total) calculates a predicted value corresponding to each prediction mode for a pixel of interest in a 4×4 pixel block. More specifically, the predicted value calculation unit 204 obtains a predicted value in prediction mode "0", and outputs it to a prediction error calculation unit 213. The predicted value calculation unit 205 obtains a predicted value in prediction mode "1", and outputs it to a prediction error calculation unit 214. The predicted value calculation unit 206 calculates a predicted value in prediction mode "2", and outputs it to a prediction error calculation unit 215 via the switch 237. Similarly, the predicted value calculation units 207 to 212 calculate predicted values in prediction modes "3" to "8", and output them to prediction error calculation units 216 to 221 via the switches 238 to 243, respectively.

The predicted value calculation unit 204 calculates predicted values in prediction mode "0". In prediction mode "0", when obtaining prediction errors of pixels a, e, i, and m in FIG. 6, a pixel P(A) in the reference pixel value storage unit 201 is directly output as the predicted values. When obtaining prediction errors of pixels b, f, j, and n, a pixel P(B) in the reference pixel value storage unit 201 is directly output as the predicted values. Similarly, pixels P(C) and P(D) are used as the predicted values of pixels located immediately below. The prediction error calculation unit 213 calculates the difference between each predicted value and pixel data (read out by the control unit 236) as a difference calculation target, and outputs the differences to a SAD calculation unit 222.

The predicted value calculation unit 205 calculates predicted values in prediction mode "1". In prediction mode "1", for the pixels a, b, c, and d in FIG. 6, a pixel P(I) in the reference pixel value storage unit 201 is directly output as the predicted values. Similarly, the predicted value calculation unit 205 calculates the prediction errors of the pixels e, f, g, and h using a pixel P(J) as the predicted values. For the remaining pixels, P(K) and P(L) are used as the prediction errors of pixel values which exist in the horizontal direction.

The predicted value calculation units 206 to 212 except for the predicted value calculation units 204 and 205 obtain predicted values by performing the above-described calculations.

The predicted value calculation unit 208 which calculates predicted values in prediction mode "4" will be explained as an example.

Figures 3, 4:
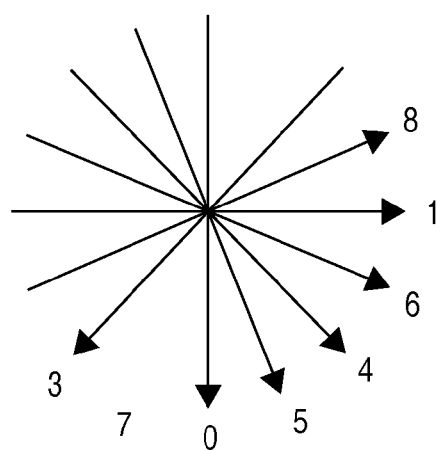
FIG. 3 is a view showing the relationship between prediction modes and prediction directions in a 4×4 pixel block.
FIG. 4 is a view showing the relationship between pixels in a 4×4 pixel block and reference pixel values.
Figure 9:
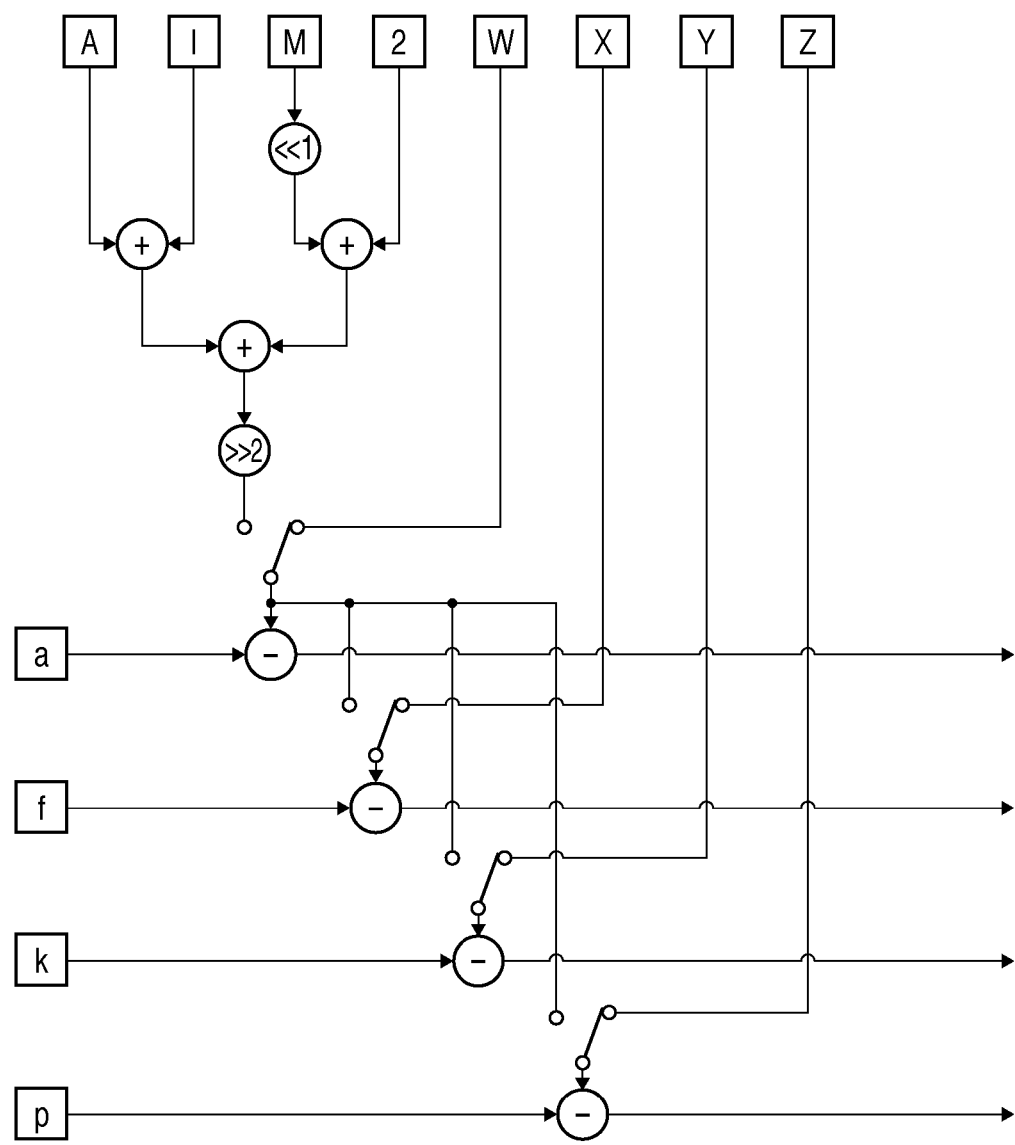
FIG. 9 is a view showing the arrangement of part of a predicted value calculation unit and a prediction error calculation unit for prediction mode "4" of a 4×4 pixel block.

In prediction mode "4", predicted values are applied in the direction indicated by the arrows in FIG. 8, thereby obtaining the prediction error of each pixel. FIG. 9 is a view showing the arrangement of part of the predicted value calculation unit 208 for calculating predicted values in prediction mode "4" and the prediction error calculation unit 217. In FIG. 9, a, f, k, and p represent the pixel values of an input picture, and A, I, and M represent reference pixel values (FIG. 4). In FIG. 9, "<<1" represents a 1-bit shift operation to the left, and ">>2" represents a 2-bit shift operation to the right. "+" represents addition, and "−" represents subtraction. The difference between a predicted value calculated based on the reference pixel values A, I, and M and each of the pixel values a, f, k, and p can be output as a prediction error.

The predicted value calculation unit 208 for prediction mode "4" has been described above. As can easily be understood, the remaining predicted value calculation units can also obtain predicted values in corresponding prediction modes, and the prediction error calculation units corresponding to them can calculate prediction errors in the same way.

Consequently, the prediction error calculation units 213 to 221 calculate prediction errors in the 4×4 pixel data and output the calculation results to the prediction error output unit 235 and the SAD calculation units 222 to 230 connected to them.

Each of the SAD calculation units 222 to 230 and 233 calculates the SAD (Sum of Absolute Difference) in a corresponding prediction mode, i.e., the sum of the absolute values of prediction errors in number set by the control unit 236. For the 4×4 pixel block to be described here, the control unit 236 sets 4×4 as the number of prediction errors. The calculated SADs are stored in a SAD storage unit 234. If the prediction unit is a 4×4 pixel block, the SAD calculation unit 233 may be disabled.

Normally, as the prediction error becomes smaller, a code word having a longer code length is assigned to increase the encoding efficiency. In other words, the smaller the SAD is, the higher the encoding efficiency is. A prediction mode determination unit 203 searches for the minimum SAD values of brightness stored in the SAD storage unit 234, determines which one of prediction modes "0" to "8" minimizes the SAD value, and outputs the determination result to the prediction error output unit 235 as prediction mode information.

The prediction error output unit 235 incorporates a buffer memory for storing the prediction errors calculated by the prediction error calculation units 213 to 221 and the chroma 8×8 mode "0" prediction error calculation unit 232. The prediction error output unit 235 selects, from the internal buffer memory, 4×4 prediction errors (prediction errors from one of the prediction error calculation units 213 to 221) specified by the prediction mode represented by the prediction mode information from the prediction mode determination unit 203, and outputs the prediction errors to the encoding unit 103. The prediction error output unit 235 also outputs 8×8 chroma prediction errors received from the chroma 8×8 mode "0" prediction error calculation unit 232 to the encoding unit 103 at a preset timing.

The operation of the prediction error calculation unit 102 which is performed when a 4×4 pixel block is selected as the prediction unit has been described above. An operation to be performed when a size other than the 4×4 pixel block is determined will be explained next.

First, an example will be described in which a 16×16 pixel block is selected as the prediction unit.

To calculate prediction errors in a 16×16 pixel block, four prediction modes "0" to "3" are used, as described above. In this embodiment, however, processing is executed using prediction modes "0" and "1", and prediction modes "2" and "3" are not employed. Note that prediction modes "2" and "3" may be implemented separately by a dedicated circuit.

Prediction mode "0" of a 16×16 pixel block is vertical prediction, like prediction mode "0" of a 4×4 pixel block. Prediction mode "1" of a 16×16 pixel block is horizontal prediction, like prediction mode "1" of a 4×4 pixel block.

Figures 5, 6:
FIG. 5 is a view showing an example of a 16×16 pixel block.
FIG. 6 is a view showing the prediction direction in prediction mode "0" of a 4×4 pixel block.

This will be described with reference to FIG. 5. FIG. 5 shows a 16×16 pixel block and part of already encoded pixel blocks. The coordinates of the upper left corner of the 16×16 pixel block are defined as (0,0). The pixel at that point is represented by P(0,0). The predicted value of the pixel P(x,y) is represented by Pred(x,y). In this case, the predicted values of the pixels in mode "0" are $$Pred(0, 0) = Pred(0, 1) = Pred(0, 2) = \ldots = Pred(0, 15) = P(0, -1)$$
$$Pred(1, 0) = Pred(1, 1) = Pred(1, 2) = \ldots = Pred(1, 15) = P(1, -1)$$
$$Pred(2, 0) = Pred(2, 1) = Pred(2, 2) = \ldots = Pred(2, 15) = P(2, -1)$$
$$\vdots$$
$$Pred(15, 0) = Pred(15, 1) = Pred(15, 2) = \ldots = Pred(15, 15) = P(15, -1)$$

The predicted values in prediction mode "1" are $$Pred(0, 0) = Pred(1, 0) = Pred(2, 0) = \ldots = Pred(15, 0) = P(-1, 0)$$
$$Pred(0, 1) = Pred(1, 1) = Pred(2, 1) = \ldots = Pred(15, 1) = P(-1, 1)$$
$$Pred(0, 2) = Pred(1, 2) = Pred(2, 2) = \ldots = Pred(15, 2) = P(-1, 2)$$
$$\vdots$$
$$Pred(0, 15) = Pred(1, 15) = Pred(2, 15) = \ldots = Pred(15, 15) = P(-1, 15)$$

As described above, the value of one pixel P(m,−1) or P(−1,m) is directly adopted as the predicted values in mode "0" or "1".

The nine prediction error calculation units 213 to 221 exist in FIG. 2. In this embodiment, eight of them are effectively used to execute parallel processing, thereby increasing the processing efficiency.

More specifically, the prediction error calculation unit 213 calculates prediction errors in mode "0" for pixels P(0,m), P(4,m), P(8,m), and P(12,m) (m=0, 1, 2, . . . , 15) in FIG. 5 (the prediction errors of four columns are calculated). Redefining this, the prediction error calculation unit 213 calculates prediction errors in mode "0" for pixels P(n,m) (n=0, 4, 8, 12; m=0, 1, 2, 3, . . . , 15).

The prediction error calculation unit 214 calculates prediction errors in mode "1" for pixels P(m,0), P(m,4), P(m,8), and P(m,12) in FIG. 5 (the prediction errors of four rows are calculated). Redefining this, the prediction error calculation unit 214 calculates prediction errors in mode "1" for pixels P(m,n). Note that the order of n and m for the prediction error calculation unit 214 is reversed to that for the prediction error calculation unit 213.

Similarly, the prediction error calculation unit 215 calculates the prediction errors of pixels P(n+1,m), the prediction error calculation unit 217 calculates the prediction errors of pixels P(n+2,m), and the prediction error calculation unit 219 calculates the prediction errors of pixels P(n+3,m) in prediction mode "0".

Also, the prediction error calculation unit 216 calculates the prediction errors of pixels P(m,n+1), the prediction error calculation unit 218 calculates the prediction errors of pixels P(m,n+2), and the prediction error calculation unit 220 calculates the prediction errors of pixels P(m,n+3) in prediction mode "1".

Since the prediction error calculation units 215 to 220 calculate the prediction errors in prediction modes "0" and "1", it is impossible to employ predicted values calculated by the predicted value calculation units 206 to 211. Hence, the control unit 236 connects the switches 237 to 242 (the switch 243 may be either enabled or disabled) to directly select pixel values from the reference pixel value storage unit 201.

When, for example, the prediction error calculation unit 213 is to calculate the prediction error of the pixel P(n,m), the control unit 236 reads out the pixel P(n,−1) from the reference pixel value storage unit 201 and outputs it to the predicted value calculation unit 204. Similarly, when the prediction error calculation unit 215 is to calculate the prediction error of the pixel P(n+1,m), the control unit 236 reads out the pixel P(n+1,−1) from the reference pixel value storage unit 201 and outputs it to the switch 237. This also applies to the prediction error calculation units 217 and 219, as a matter of course.

On the other hand, when the prediction error calculation unit 214 is to calculate the prediction error of the pixel P(m,n), the control unit 236 reads out the pixel P(−1,n) from the reference pixel value storage unit 201 and outputs it to the predicted value calculation unit 205. Similarly, when the prediction error calculation unit 216 is to calculate the prediction error of the pixel P(m,n+1), the control unit 236 reads out the pixel P(−1,n+1) from the reference pixel value storage unit 201 and outputs it to the switch 238. This also applies to the prediction error calculation units 218 and 220, as a matter of course.

As a result, each of the prediction error calculation units 213 to 220 (the calculation result of the prediction error calculation unit 221 is ignored) calculates 16×4 prediction errors.

Each of the SAD calculation units 222 to 229 (the calculation result of the SAD calculation unit 230 is ignored) calculates the sum of the prediction errors of a corresponding one of the prediction error calculation units 213 to 220, and stores the calculation result in the SAD storage unit 234.

The sum of the calculation results of the SAD calculation unit 222, 224, 226, and 228 corresponds to the sum of the absolute values of the prediction errors of the 16×16 pixels in prediction mode "0". The sum of the calculation results of the SAD calculation unit 223, 225, 227, and 229 obviously corresponds to the sum of the absolute values of the prediction errors of the 16×16 pixels in prediction mode "1".

The prediction mode determination unit 203 compares the sum of the prediction errors in prediction mode "0" with that in prediction mode "1", and outputs the prediction mode which makes the value smaller to the prediction error output unit 235 as prediction mode information.

Upon receiving prediction mode information representing prediction mode "0" from the prediction mode determination unit 203, the prediction error output unit 235 outputs information representing the prediction mode. Then, the prediction error output unit 235 rearranges, in a preset order, the prediction errors calculated by the prediction error calculation units 213, 215, 217, and 219 and stored in the internal buffer, and outputs them. The prediction error output unit 235 also outputs prediction errors obtained by the chroma 8×8 mode "0" prediction error calculation unit 232 at a preset timing.

Upon receiving prediction mode information representing prediction mode "1" from the prediction mode determination unit 203, the prediction error output unit 235 outputs information representing the prediction mode. Then, the prediction error output unit 235 appropriately rearranges the prediction errors calculated by the prediction error calculation units 214, 216, 218, and 220 and stored in the internal buffer, and outputs them. The prediction error output unit 235 also outputs prediction errors obtained by the chroma 8×8 mode "0" prediction error calculation unit 232 at an appropriate timing.

Processing which is performed when the block size determination unit 101 selects a 16×16 pixel block as the prediction unit has been described above. As is apparent from the above description, the nine prediction error calculation units for modes "0" to "8" of a 4×4 pixel block can effectively be used. More specifically, eight prediction error calculation units can parallelly calculate prediction errors of a 16×16 pixel block in modes "0" and "1".

Processing to be performed when the block size determination unit 101 selects an 8×8 pixel block as the prediction unit will be explained next. For an 8×8 pixel block (FIG. 10), four prediction modes "0" to "3" are used. However, a predicted value calculation method represented by the number of each prediction mode for an 8×8 pixel block is different from that for a 4×4 or 16×16 pixel block. More specifically, prediction mode "0" of an 8×8 pixel block represents mean value prediction. In an 8×8 pixel block, prediction mode "1" is vertical prediction, prediction mode "2" is horizontal prediction, and prediction mode "3" is planar prediction.

Hence, in prediction modes "1" and "2" of the 8×8 pixel block, parallel processing can be implemented by performing the same processing as in prediction modes "0" and "1" of a 16×16 pixel block. In this embodiment, processing for an 8×8 pixel block is performed using not prediction modes "0" and "3" but prediction modes "1" and "2". Note that prediction modes "0" and "3" may be implemented separately by a dedicated circuit.

In prediction modes "1" and "2" of the 8×8 pixel block, predicted values are obtained using only one reference pixel value, as described above. Hence, the control unit 236 connects the switches 237 to 242 to directly input pixel values from the reference pixel value storage unit 201, as in prediction error calculation of a 16×16 pixel block.

The prediction error calculation unit 213 calculates prediction errors in mode "1" for pixels P(0,m) and P(4,m) (m=0, 1, 2, . . . , 7) in FIG. 10. Redefining this, the prediction error calculation unit 213 calculates prediction errors in mode "1" for pixels P(n,m) (n=0, 4; m=0, 1, 2, 3, . . . , 7).

The prediction error calculation unit 214 calculates prediction errors in mode "2" for pixels P(m,0) and P(m,4) in FIG. 10. Redefining this, the prediction error calculation unit 214 calculates prediction errors in mode "2" for pixels P(m,n). Note that the order of n and m for the prediction error calculation unit 214 is reversed to that for the prediction error calculation unit 213.

Similarly, the prediction error calculation unit 215 calculates the prediction errors of pixels P(n+1,m), the prediction error calculation unit 217 calculates the prediction errors of pixels P(n+2,m), and the prediction error calculation unit 219 calculates the prediction errors of pixels P(n+3,m) in prediction mode "1".

Also, the prediction error calculation unit 216 calculates the prediction errors of pixels P(m,n+1), the prediction error calculation unit 218 calculates the prediction errors of pixels P(m,n+2), and the prediction error calculation unit 220 calculates the prediction errors of pixels P(m,n+3) in prediction mode "2".

When, for example, the prediction error calculation unit 213 is to calculate the prediction error of the pixel P(n,m), the control unit 236 reads out the pixel P(n,−1) from the reference pixel value storage unit 201 and outputs it to the predicted value calculation unit 204. Similarly, when the prediction error calculation unit 215 is to calculate the prediction error of the pixel P(n+1,m), the control unit 236 reads out the pixel P(n+1,−1) from the reference pixel value storage unit 201 and outputs it to the switch 237. This also applies to the prediction error calculation units 217 and 219, as a matter of course.

On the other hand, when the prediction error calculation unit 214 is to calculate the prediction error of the pixel P(m,n), the control unit 236 reads out the pixel P(−1,n) from the reference pixel value storage unit 201 and outputs it to the predicted value calculation unit 205. Similarly, when the prediction error calculation unit 216 is to calculate the prediction error of the pixel P(m,n+1), the control unit 236 reads out the pixel P(−1,n+1) from the reference pixel value storage unit 201 and outputs it to the switch 238. This also applies to the prediction error calculation units 218 and 220, as a matter of course.

As a result, each of the prediction error calculation units 213 to 220 (the calculation result of the prediction error calculation unit 221 is ignored) calculates 8×2 prediction errors.

Each of the SAD calculation units 222 to 229 (the calculation result of the SAD calculation unit 230 is ignored) calculates the sum of the prediction errors of a corresponding one of the prediction error calculation units 213 to 220, and stores the calculation result in the SAD storage unit 234.

The sum of the calculation results of the SAD calculation unit 222, 224, 226, and 228 corresponds to the sum of the absolute values of the prediction errors of the 8×8 pixels in prediction mode "1". The sum of the calculation results of the SAD calculation unit 223, 225, 227, and 229 corresponds to the sum of the absolute values of the prediction errors of the 8×8 pixels in prediction mode "2", as is apparent.

The prediction mode determination unit 203 compares the sum of the prediction errors in prediction mode "1" with that in prediction mode "2", and outputs the prediction mode which makes the value smaller to the prediction error output unit 235 as prediction mode information.

Upon receiving prediction mode information representing prediction mode "1" from the prediction mode determination unit 203, the prediction error output unit 235 outputs information representing the prediction mode. Then, the prediction error output unit 235 appropriately rearranges the prediction errors calculated by the prediction error calculation units 213, 215, 217, and 219 and stored in the internal buffer, and outputs them. The prediction error output unit 235 also outputs prediction errors obtained by the chroma 8×8 mode "0" prediction error calculation unit 232 at an appropriate timing.

Upon receiving prediction mode information representing prediction mode "2" from the prediction mode determination unit 203, the prediction error output unit 235 outputs information representing the prediction mode. Then, the prediction error output unit 235 appropriately rearranges the prediction errors calculated by the prediction error calculation units 214, 216, 218, and 220 and stored in the internal buffer, and outputs them. The prediction error output unit 235 also outputs prediction errors obtained by the chroma 8×8 mode "0" prediction error calculation unit 232 at an appropriate timing.

Processing which is performed when the block size determination unit 101 selects a 8×8 pixel block as the prediction unit has been described above.

As described above, according to this embodiment, the apparatus includes predicted value calculation units and prediction error calculation units in all prediction modes for image data which is segmented into 4×4 pixel blocks. Effective use of this arrangement enables parallel processing in prediction modes "0" and "1" of an 8×8 pixel block and in prediction modes "1" and "2" of a 16×16 pixel block. This prevents any increase in the circuit scale and also any increase in the process time for an 8×8 pixel block or a 16×16 pixel block.

In this embodiment, processing is performed for an 8×8 pixel block without using prediction mode "0" to "3" and for a 16×16 pixel block without using prediction mode "2" to "3". However, even when circuits corresponding to these block sizes and the modes are added, sufficient effects can be obtained as compared to the related art, although the circuit scale increases.

For example, especially in mode "0" of an 8×8 pixel block, the chroma 8×8 mode "0" predicted value calculation unit 231, chroma 8×8 mode "0" prediction error calculation unit 232, and chroma 8×8 mode "0" SAD calculation unit may alternatively be used. This is because both the predicted value calculation method in the chroma 8×8 mode "0" and that in mode "0" of an 8×8 pixel block are mean value prediction and enable equivalent processing with the only difference being that the reference pixel value is a brightness or a color difference.

Obviously, the above-described embodiment is also applicable to H.264.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-058701, filed Mar. 7, 2008, which is hereby incorporated by reference herein in its entirety.

What is claimed is:

1. An image encoding apparatus which calculates a prediction error in each predetermined pixel block of an input picture by referring to a pixel in the picture and supplies the prediction error to an encoding unit, thereby encoding the picture, comprising:
   a storage unit which stores image data of an encoding target picture;
   a determination unit which determines a size of an encoding target pixel block among three pixel block sizes 4×4, 8×8, and 16×16;
   a plurality of predicted value calculation units corresponding to all prediction modes of the pixel block size "4×4";
   a plurality of prediction error calculation units, each of which calculates, using a predicted value, a prediction error of a predetermined pixel in the pixel block size determined by said determination unit, wherein the plurality of prediction error calculation units includes at least first and second types of prediction error calculation units;
   wherein the first type prediction error calculation unit calculates, based on a predicted value from a predicted value calculation unit in a prediction mode using one reference pixel value as a predicted value, a prediction error of a pixel in the pixel block size determined by said determination unit and
   wherein the second type prediction error calculation unit calculates, based on a predicted value from a predicted value calculation unit in a prediction mode for calculating a predicted value based on a plurality of reference pixel values or a predicted value representing one reference value, a prediction error of a pixel in the pixel block size determined by said determination unit;
   said image encoding apparatus further comprising:
   an output unit which determines, based on sums of the prediction errors calculated by each of the plurality of prediction error calculation units, a prediction mode which minimizes the sum of the prediction errors, and outputs, to the encoding unit, a prediction error obtained by a prediction error calculation unit corresponding to the determined prediction mode; and
   a control unit which controls to cause said second type prediction error calculation unit to calculate the prediction error from a plurality of reference pixel values if said determination unit determines the 4×4 pixels as the size of the encoding target pixel block, while said control unit causes said second type prediction calculation unit to calculate the prediction error from one reference pixel value if said determination unit determines the size other than the 4×4 pixels as the size of the encoding target pixel block.

2. The apparatus according to claim 1, wherein the pixel block is one of a 4×4 pixel block, an 8×8 pixel block, and a 16×16 pixel block, all prediction modes of the 4×4 pixel block include prediction modes "0" to "8", all prediction modes of the 8×8 pixel block using one reference pixel value as a predicted value include prediction modes "1" and "2", and all prediction modes of the 16×16 pixel block using one reference pixel value as a predicted value include prediction modes "0" and "1".

3. The apparatus according to claim 1, wherein said determination unit comprises a unit which calculates a ratio of continuous pixels having the same pixel value in the input encoding target image data, and determines the size of the encoding target pixel block in proportion to the ratio.

4. The apparatus according to claim 1, further comprising:
   a chroma 8×8 pixel block predicted value calculation unit; and
   a chroma 8×8 pixel block prediction error calculation unit.

5. The apparatus according to claim 4, wherein if the pixel block size determined by said determination unit is an 8×8 pixel block, said chroma 8×8 pixel block predicted value calculation unit and said chroma 8×8 pixel block prediction error calculation unit are alternatively used to calculate a predicted value and a prediction error in a prediction mode "0".

* * * * *